US 9,242,601 B2

United States Patent
You et al.

(10) Patent No.: US 9,242,601 B2
(45) Date of Patent: Jan. 26, 2016

(54) METHOD AND DEVICE FOR DETECTING DRIVABLE REGION OF ROAD

(71) Applicants: Ganmei You, Beijing (CN); Yaojie Lu, Beijing (CN); Zhongchao Shi, Beijing (CN); Gang Wang, Beijing (CN)

(72) Inventors: Ganmei You, Beijing (CN); Yaojie Lu, Beijing (CN); Zhongchao Shi, Beijing (CN); Gang Wang, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/034,689

(22) Filed: Sep. 24, 2013

(65) Prior Publication Data

US 2014/0086477 A1 Mar. 27, 2014

(30) Foreign Application Priority Data

Sep. 24, 2012 (CN) .......................... 2012 1 0358202

(51) Int. Cl.
*G06K 9/00* (2006.01)
*B60Q 9/00* (2006.01)
*G06T 7/00* (2006.01)
*G06K 9/46* (2006.01)
*B60W 40/06* (2012.01)

(52) U.S. Cl.
CPC .............. *B60Q 9/008* (2013.01); *B60W 40/06* (2013.01); *G06K 9/00791* (2013.01); *G06K 9/00798* (2013.01); *G06K 9/00805* (2013.01); *G06K 9/4647* (2013.01); *G06T 7/0051* (2013.01); *B60W 2420/42* (2013.01); *G06K 9/00* (2013.01)

(58) Field of Classification Search
CPC .............. G06F 3/017; H04N 13/0022; H04N 2013/0081; G06K 9/00335; G06K 9/00798; G06K 9/6292; G06K 9/3241; G06K 9/00208; G06K 9/4609; G06K 9/00805; B60W 2420/42; G06T 2207/10012; G06T 7/004; G06T 7/0042; G06T 7/2033; G06T 7/0022; B60R 21/015; B60R 2300/30
USPC ........... 382/103, 104, 154; 348/148; 701/301, 701/36; 715/835, 848, 863
See application file for complete search history.

(56) References Cited

U.S. PATENT DOCUMENTS

| | | | | |
|---|---|---|---|---|
| 5,917,937 | A * | 6/1999 | Szeliski et al. | 382/154 |
| 6,956,469 | B2 * | 10/2005 | Hirvonen et al. | 340/435 |
| 7,224,357 | B2 * | 5/2007 | Chen et al. | 345/420 |
| 7,587,081 | B2 * | 9/2009 | Rovira-Mas et al. | 382/154 |
| 7,965,866 | B2 * | 6/2011 | Wang et al. | 382/103 |

(Continued)

OTHER PUBLICATIONS

Jia Wang1, Zhencheng Hu2, Hanging Lu1, and Keiichi Uchimura, Narayanan et al. "Motion detection in driving enviroment using U-V-Disparity" (Eds.); ACCV 2006, LNCS 3851, pp. 307-316, 2006.*

(Continued)

*Primary Examiner* — Vu Le
*Assistant Examiner* — Aklilu Woldemariam
(74) *Attorney, Agent, or Firm* — Harness, Dickey & Pierce, P.L.C.

(57) ABSTRACT

A method and a device are disclosed for detecting a drivable region of a road, the method comprising the steps of: deriving a disparity map from a gray-scale map including the road and detecting the road from the disparity map; removing a part with a height above the road greater than a predetermined height threshold from the disparity map so as to generate a sub-disparity map; converting the sub-disparity map into a U-disparity map; detecting the drivable region from the U-disparity map; and converting the drivable region detected from the U-disparity map into the drivable region within the gray-scale map.

9 Claims, 16 Drawing Sheets

(56) References Cited

U.S. PATENT DOCUMENTS

| | | | |
|---|---|---|---|
| 8,694,922 B2* | 4/2014 | Doyen et al. | 715/863 |
| 8,861,791 B2* | 10/2014 | You et al. | 382/104 |
| 2003/0204384 A1* | 10/2003 | Owechko et al. | 703/1 |
| 2005/0015201 A1 | 1/2005 | Fields et al. | |
| 2006/0095207 A1* | 5/2006 | Reid | 701/301 |
| 2009/0010490 A1* | 1/2009 | Wang et al. | 382/103 |
| 2009/0141967 A1* | 6/2009 | Hattori | 382/154 |
| 2010/0103175 A1* | 4/2010 | Okutomi et al. | 345/428 |
| 2010/0250064 A1 | 9/2010 | Ota et al. | |
| 2011/0032341 A1* | 2/2011 | Ignatov et al. | 348/51 |
| 2011/0292189 A1* | 12/2011 | Newton et al. | 348/51 |
| 2012/0014590 A1* | 1/2012 | Martinez-Bauza et al. | 382/154 |
| 2012/0114250 A1 | 5/2012 | Zhong et al. | |
| 2014/0098199 A1* | 4/2014 | Yeatman et al. | 348/48 |

OTHER PUBLICATIONS

Soquet et al., "Free Space Estimation for Autonomous Navigation," 5th International Conference on Computer Vision Systems, 2007, Applied Computer Science Group, Bielefeld University, Germany.

Tarel et al., "Long-Range Road Detection for Off-Line Scene Analysis", Intellligent Vehicles Symposium, 2009 IEEE, IEEE Piscataway, NJ, USA, Jun. 3, 2009, p. 15-20.

European Search Report for European Application No. 13185130.5 dated Feb. 17, 2015.

* cited by examiner

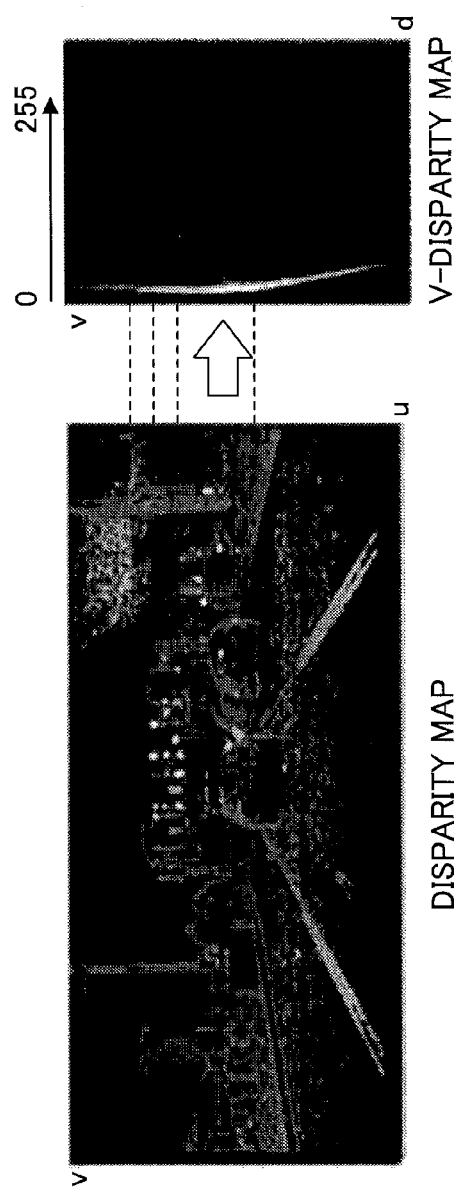
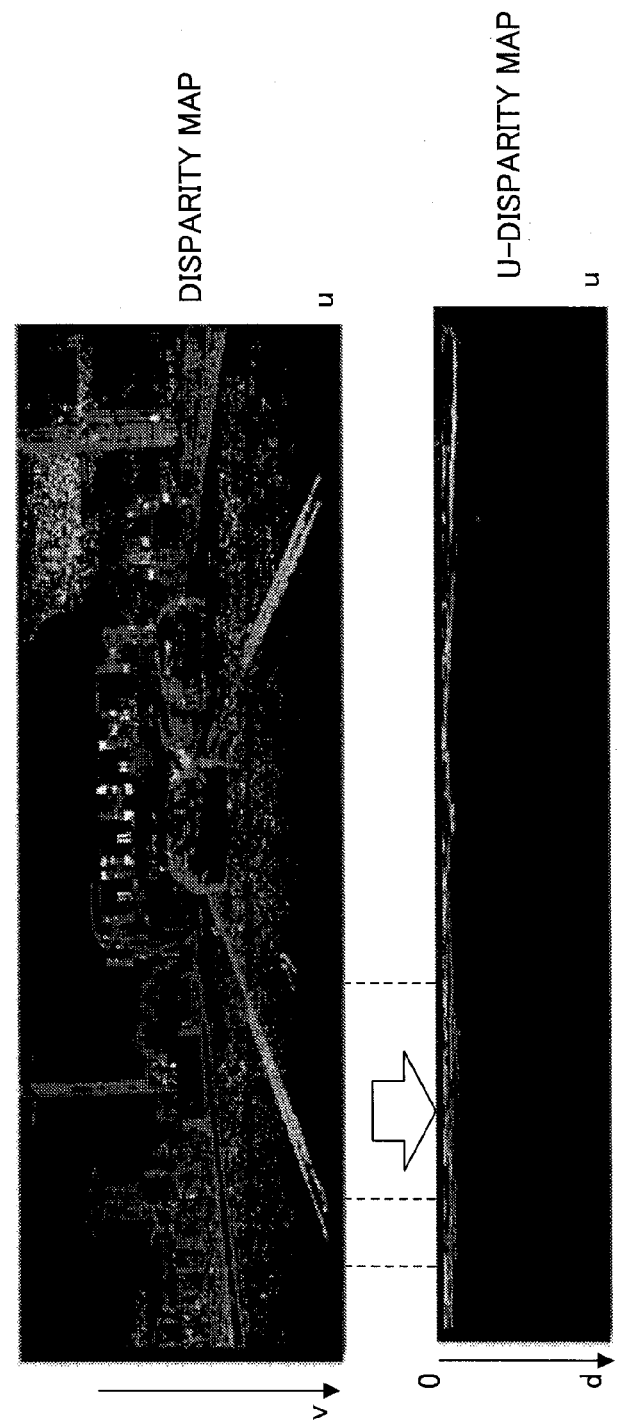
FIG.1
FIG.2 v = 0.5*d + 233

METHOD AND DEVICE FOR DETECTING DRIVABLE REGION OF ROAD

BACKGROUND OF THE INVENTION

1. Field of the Invention

The present invention generally relates to road detection, and specifically, a method and a device for detecting a drivable region of a road.

2. Description of the Related Art

Currently, a driving assistance technology of an automobile is studied. This technology can provide needed information and/or warning to a user when the user drives the car, so that a dangerous situation such as a vehicle collision or vehicle deviation from the road can be avoided. Furthermore, the driving assistance technology may be used to control the moving of the car automatically in some cases.

In the driving assistance technology, it is important to detect the drivable region of the road correctly. Many methods for detecting the drivable region of the road have been disclosed. For example, U.S. Patent Application Publication US20100250064A1 discloses a method for detecting a drivable region by using the white lines on both sides of the road, however such a method cannot be applied to a road where the white lines do not exist on both sides thereof. The U.S. Patent Application Publication US20050015201A1 discloses a method for segmenting a road and detecting a drivable region by a distance and a segmental slope, however such a method cannot be applied to a sparse disparity map where points on the road are sparse.

Therefore, there is a demand for providing a method and device for reliably detecting a drivable region of a road.

SUMMARY OF THE INVENTION

The present invention is made in light of the above problems. It is an object of the present invention to provide a method and device for reliably detecting a drivable region of a road.

According to an aspect of the present invention, a method for detecting a drivable region of a road comprises the steps of: deriving a disparity map from a gray-scale map including the road and detecting the road from the disparity map; removing a part with a height above the road greater than a predetermined height threshold from the disparity map so as to generate a sub-disparity map; converting the sub-disparity map into a U-disparity map; detecting the drivable region from the U-disparity map; and converting the drivable region detected from the U-disparity map into the drivable region within the gray-scale map.

According to the above aspect of the present invention, the step of detecting the road from the disparity map may comprise the steps of: converting the disparity map into a V-disparity map; and fitting a road line representing the road in the V-disparity map.

According to the above aspect of the present invention, the sub-disparity map may be generated by removing a part that is located above the road line and has a distance from the road line greater than the predetermined height threshold from the disparity map.

According to the above aspect of the present invention, the step of detecting the drivable region from the U-disparity map may comprise the steps of: selecting an initial position within the drivable region from the U-disparity map; and detecting a specific region from the U-disparity map as the drivable region by shifting a detection window with a predetermined size from the initial position in the U-disparity map, wherein the specific region includes the initial position, and the number of active points with a brightness greater than a brightness threshold within the detection window is less than a predetermined number threshold during the time when the detection window is shifted in the specific region.

According to the above aspect of the present invention, the step of detecting a specific region from the U-disparity map as the drivable region by shifting a detection window with a predetermined size from the initial position in the U-disparity map may comprise the steps of: (a) horizontally shifting the detection window along a direction of rows to the left from the initial position, and stopping the shifting of the detection window and recording the stop position of the detection window as a left stop position of the said row if a first determined condition is met, horizontally shifting the detection window along a direction of rows to the right from the initial position, and stopping the shifting of the detection window and recording the stop position of the detection window as a right stop position of the said row if a second determined condition is met; (b) shifting the detection window upward by a distance equal to the height of the detection window, and repeating step (a); (c) repeating step (b) until the detection window reaches a top edge of the U-disparity map or the left stop position and the right stop position in the same row are adjacent to each other; and (d) extracting a region covered by the shifted detection windows from the U-disparity map as the drivable region, wherein the first predetermined condition is one of the condition that the number of the active points within the detection window is greater than a predetermined number threshold; the condition that the detection window reaches a left edge of the U-disparity map, even though the number of the active points within the detection window is not greater than the predetermined number threshold; and the condition that the horizontal distance between the position of the detection window and the left stop position of the previous row is less than a first distance threshold, even though the detection window does not reach the left edge of the U-disparity map and the number of the active points within the detection window is not greater than the predetermined number threshold, wherein the second predetermined condition is one of the condition that the number of the active points within the detection window is greater than a predetermined number threshold; the condition that the detection window reaches a right edge of the U-disparity map, even though the number of the active points within the detection window is not greater than the predetermined number threshold; and the condition that the horizontal distance between the position of the detection window and the right stop position of the previous row is less than a second distance threshold, even though the detection window does not reach the right edge of the U-disparity map and the number of the active points within the detection window is not greater than the predetermined number threshold.

According to the above aspect of the present invention, the step of converting the drivable region detected from the U-disparity map into the drivable region within the gray-scale map may comprise the steps of: obtaining coordinates of points within the drivable region detected from the U-disparity map; calculating coordinates of points within the drivable region of the gray-scale map based on the coordinates of the points, by an expression for fitting the road line in the V-disparity map; and extracting the drivable region within the gray-scale map based on the coordinates of the points within the drivable region of the gray-scale map.

According to another aspect of the present invention, a device for detecting a drivable region of a road comprise: a road detecting apparatus configured to derive a disparity map from a gray-scale map including the road and detect the road from the disparity map; a sub-disparity map generating apparatus configured to remove a part with a height above the road greater than a predetermined height threshold from the disparity map so as to generate a sub-disparity map; a U-disparity map generating apparatus configured to convert the sub-disparity map into a U-disparity map; a U-disparity map detecting apparatus configured to detect the drivable region from the U-disparity map; and a drivable region converting apparatus configured to convert the drivable region detected from the U-disparity map into the drivable region within the gray-scale map.

According to the above aspect of the present invention, the road detecting apparatus may comprise: a V-disparity map generating unit configured to convert the disparity map into a V-disparity map; and a road line fitting unit configured to fit a road line representing the road in the V-disparity map.

According to the above aspect of the present invention, the U-disparity map detecting apparatus may comprise: a selection unit configured to select an initial position within the drivable region from the U-disparity map; and a detection unit configured to detect a specific region from the U-disparity map as the drivable region by shifting a detection window with a predetermined size from the initial position in the U-disparity map, wherein the specific region includes the initial position, and the number of active points with a brightness greater than a brightness threshold within the detection window is less than a predetermined number threshold during the time when the detection window is shifted in the specific region.

According to the above aspect of the present invention, the drivable region converting apparatus may comprise: a coordinate extracting unit configured to obtain coordinates of points within the drivable region detected from the U-disparity map; a conversion unit configured to calculate coordinates of points within the drivable region of the gray-scale map based on the coordinates of the points, by an expression for fitting the road line in the V-disparity map; and a drivable region extracting unit configured to extract the drivable region within the gray-scale map based on the coordinates of the points within the drivable region of the gray-scale map.

The method and the device for detecting the drivable region of the road according to the above aspect of the present invention have a wide application range, because they do not depend on white lines or a fence on the road. Additionally, the method and the device detect the drivable region based on the density of the active points within the detection window, according to the U-disparity map obtained from the disparity map; therefore, they have high anti-noise robustness and reliability.

BRIEF DESCRIPTION OF THE DRAWINGS

The above object and other objects of the present invention will become more apparent from the following detailed description of the embodiments of the present invention when read in conjunction with the accompanying drawings.

FIG. 1 is a schematic drawing illustrating a process of deriving a V-disparity map from a disparity map;

FIG. 2 is a schematic drawing illustrating a process of deriving a U-disparity map from a disparity map;

Figure 3:
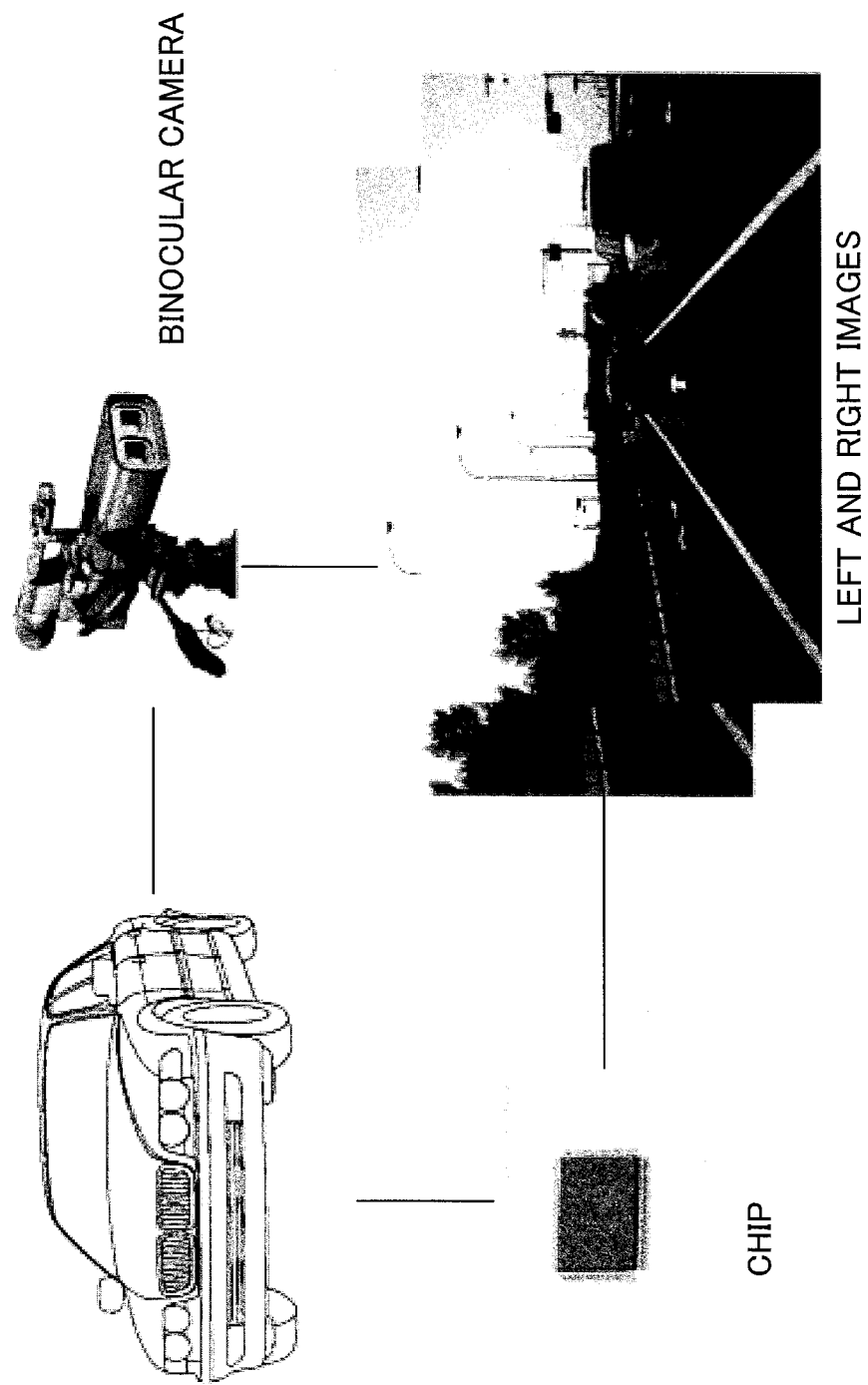
FIG. 3 is a schematic drawing illustrating a system capable of executing the method for detecting a drivable region of a road according to the embodiment of the present invention.

It should be noted that the above drawings may be not drawn to scale, such drawings are for descriptive purposes only and the present invention is not limited to such drawings.

DETAILED DESCRIPTION OF THE PREFERRED EMBODIMENTS

In the following, embodiments of the present invention are described with reference to the accompanying drawings, so as to facilitate the understanding of the present invention.

<Introduction of Essential Concepts>

In the embodiments of the present invention, concepts of "disparity", "disparity map", "V-disparity map" and "U-disparity map" are used. These concepts are well-known in the art, therefore these concepts will be briefly introduced as follows.

"Disparity" indicates an angle made by two straight lines that are drawn from opposite ends of a base line to a distant object. In general, it means a direction difference generated by looking at the same object from two points having a certain separation distance. The angle that is generated by looking at the two points from the object is called a "disparity angle" of the two points, and the distance between the two points is called a "base line". A distance between the object and an observer can be calculated as long as the disparity angle and length of the base line are known.

"Disparity map" is an image that is based on a reference image, the size of the disparity map is the size of the reference image, points (pixels) of the disparity map correspond to points of the reference image that have the same coordinates, and gray scales of the points are images of the disparities of the corresponding points within the reference image. The disparity map may be obtained by a variety methods in the art. For example, the disparity map may be calculated from left and right images picked up by a binocular camera, be calculated from images picked up by a multi-camera or a stereo camera, or be calculated from a depth map of a stereogram. In the case where left and right images are picked up by a binocular camera, a SAD (Sum of Absolute Differences) algorithm or other algorithms in the art may be used on the left and right images to calculate the disparity map.

The coordinates of a point of a reference image may be represented as (x,y), where x is abscissa and y is ordinate, and the smaller y is, the nearer the point from the camera. In the two-dimensional disparity map obtained by converting the reference image, the coordinates of a point corresponding to the point (x,y) may be represented as (u,v), where u is abscissa, v is ordinate, u=x and v=y. The gray value of each of points within the disparity map is the disparity of the point, and is represented as d. Alternatively, the point within the disparity map may be represented as (u,v,d) so as to reflect the coordinates and the disparity of the point simultaneously.

The V-disparity map and the U-disparity map may be derived from the disparity map. The V-disparity may be regarded as a side view of the disparity map, where the abscissa axis is the d axis, the ordinate axis is the v axis, the point may be represented as (d,v), and the gray value (brightness value) of the point (d,v) is the number of the points of the corresponding disparity map where the ordinate is v and the disparity value is equal to d. Therefore, the V-disparity map may be derived from the disparity map by the statistics of the numbers or other methods in the art. FIG. 1 is a schematic drawing illustrating a process of deriving a V-disparity map from a disparity map. The U-disparity may be regarded as a top view of the disparity map, where the abscissa axis is the u axis, the ordinate axis is the d axis, the point may be represented as (u,d), and the gray value (brightness value) of the point (u,d) is the number of the points of the corresponding disparity map where the abscissa is u and the disparity value is equal to d. Therefore, the U-disparity map may be derived from the disparity map by the statistics of the numbers or other methods in the art. FIG. 2 is a schematic drawing illustrating a process of deriving a U-disparity map from a disparity map.

<Embodiment>

In the following, the method and the device for detecting the drivable region of the road according to the embodiment of the present invention will be described with reference to the accompanying drawings.

First, the method for detecting the drivable region of the road according to the embodiment of the present invention will be described. Such method may be performed by, for example, the system illustrated in FIG. 3. As illustrated in FIG. 3, a binocular camera may be mounted in a car. When the car moves on the road, left and right images in front of the car that include the road (road surface) are picked up by the binocular camera. The images are input into a chip for processing the left and right images so as to obtain the disparity map, and the drivable region on the road is detected from the disparity map according to the following method as described below.

Figure 4:
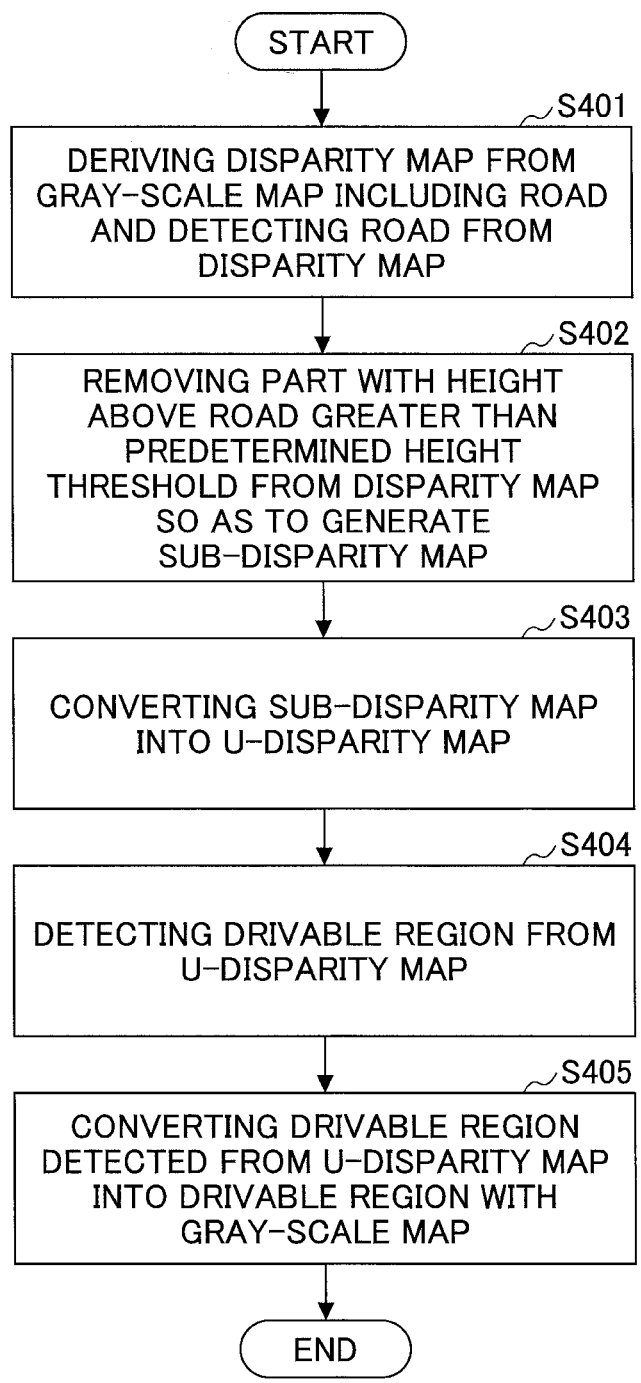
FIG. 4 is a flowchart illustrating the method for detecting the drivable region of the road according to the embodiment of the present invention.

FIG. 4 is a flowchart illustrating the method for detecting the drivable region of the road according to the embodiment of the present invention.

As illustrated in FIG. 4, in step S401, a disparity map is derived from a gray-scale map including the road, and the road is detected from the disparity map.

Figure 5:
FIG. 5 is a schematic drawing illustrating an example of one of the left and right images picked up by a binocular camera.

In the case where a binocular camera is used, left and right images (gray scale images) including the road may be previously obtained. The binocular camera may be mounted in the car, and left and right gray scale images in front of the car that include the road are picked up; or left and right color images including the road may be picked up by the binocular camera, and be converted into gray scale images. FIG. 5 is a schematic drawing illustrating an example of one of the left and right images picked up by a binocular camera. In the following, such an image is described as an example. As illustrated in FIG. 5, a coordinate system is built into such images, and points thereof may be represented as (x, y).

Figure 6:
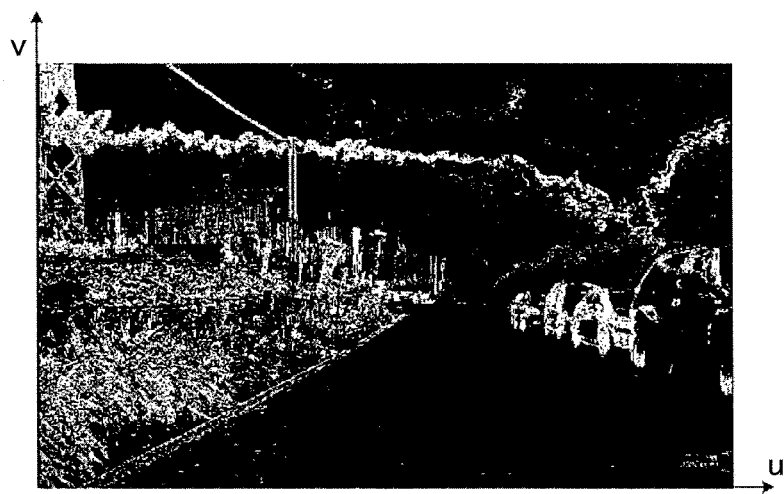
FIG. 6 is a schematic drawing illustrating a disparity map calculated by using the image illustrated in FIG. 5 as a reference image.

Next, any one image from the left and right images may be selected as the reference image, and the disparity map including the road is derived from the left and right images. The disparity map may be calculated from the left and right images by the above method, description of this is omitted here. FIG. 6 is a schematic drawing illustrating a disparity map calculated by using the image illustrated in FIG. 5 as a reference image. As illustrated in FIG. 6, a U-V coordinate system is built into the disparity map, and the point within the disparity map corresponding to the point (x, y) may be represented as (u, v, d), where u=x, v=y, d is the disparity of the point. It should be noted that the edges of an object (such as the edge of the road, an obstacle on the road and the edge of objects except the road) are easily identified, and it is difficult to identify the parts of the road that do not have an edge, when the disparity map is calculated from the left and right images by a matching algorithm; therefore, in the disparity map, the positions corresponding to the edges have dense points, and the parts without an edge such as the drivable region of the road have sparse points.

In the following, the road is detected based on the disparity map.

Figure 7:
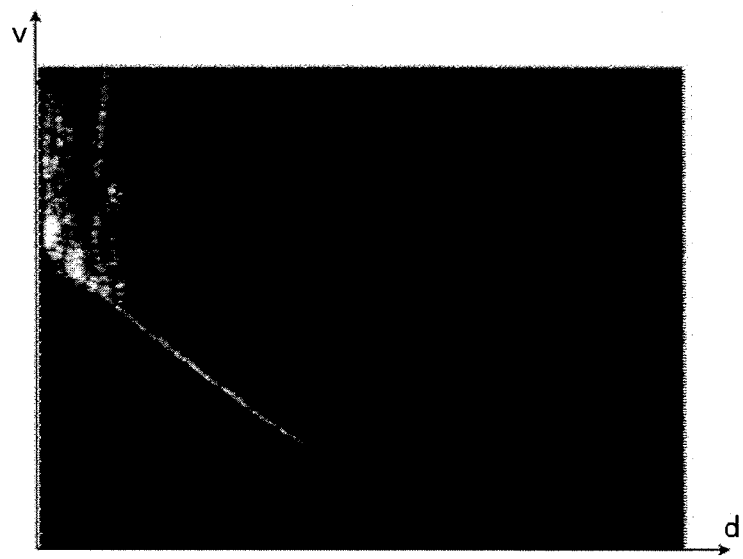
FIG. 7 is a schematic drawing illustrating a V-disparity map obtained by converting the disparity map illustrated in FIG. 6.

Specifically, the disparity map including the road may be converted into a V-disparity map. Such conversion may be performed by the method as described above, description of this is omitted here. FIG. 7 is a schematic drawing illustrating a V-disparity map obtained by converting the disparity map illustrated in FIG. 6.

Figure 8:
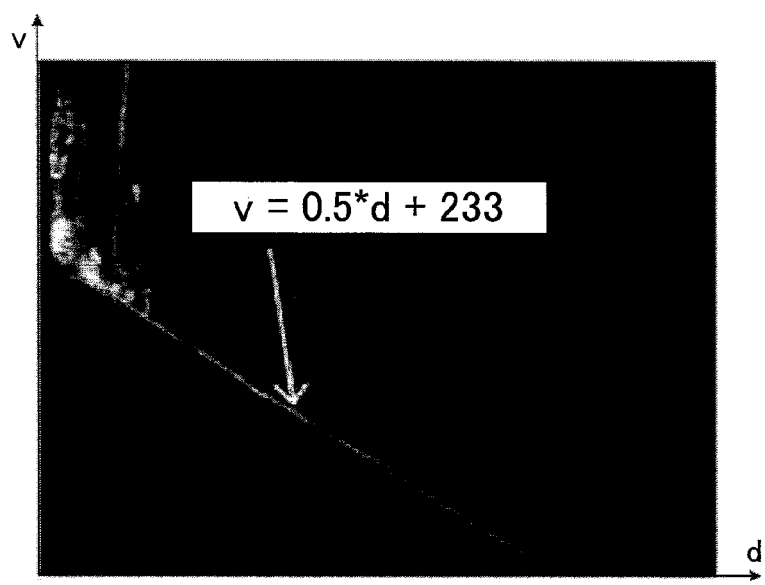
FIG. 8 is a schematic drawing illustrating a road line obtained by performing a fitting in the V-disparity map illustrated in FIG. 7.

Next, a fitting of a road line representing the road may be performed in the V-disparity map. In the image picked up by the camera mounted on the car, the road extends upward and becomes narrower from the bottom of the image. In the top side of the image, other non-road objects increase. Accordingly, in the V-disparity map, most of the points corresponding to the road are located in the lower part of all the points that are illustrated in the drawing, and most of the points of the upper part correspond to other non-road objects. Therefore, the lowest part of all the points illustrated in the V-disparity map may be selected to perform the fitting, so that the road line representing the road can be fit and an expression of the road line $v=kd+b$ can be obtained, where k is the slope of the road line and b is a constant. For example, the fitting may be performed by a method proposed in the paper "Detection of Non-flat Ground Surfaces Using V-Disparity Images" written by Jun Zhao, Mark Albert Whitty and Jayantha Katupitiya, 2009 IEEE/RSJ International Conference on Intelligent Robots and Systems, Oct. 11-15, 2009, St. Louis, USA. In the example illustrated in FIG. 7, a road line illustrated in FIG. 8 that the expression thereof is $v=0.5d+233$ can be obtained by selecting the lowest part of all the points according to the above method and performing the fitting.

Returning to FIG. 4, in step S402, a part with a height above the road greater than a predetermined height threshold is removed from the disparity map so as to generate a sub-disparity map.

It is generally known that there may be tall objects such as telephone poles, trees and columns on both sides of the road. Additionally, there may be overhead wires above the road. In the detection of the drivable region of the road by the U-disparity map as described below, these non-road objects may be reflected in the U-disparity map and detected incorrectly as the road, if proper processing for these objects is not performed.

In order to avoid such a problem, considering the fact that the above objects have a certain height from the road surface, a height threshold may be predetermined, the part with a height above the road greater than the predetermined height threshold is removed from the disparity map so as to generate the sub-disparity map, and the U-disparity map is generated by the sub-disparity map rather than the disparity map. As described above, the road line within the V-disparity map represents the road, therefore the sub-disparity map may be generated by removing a part that is located above the road line and has a distance from the road line greater than the predetermined height threshold from the disparity map. Such a height threshold may be freely set as, for example, 4 meters, based on the actual situation of the road (such as the type of the obstacle, the height and the distribution).

Figure 9:
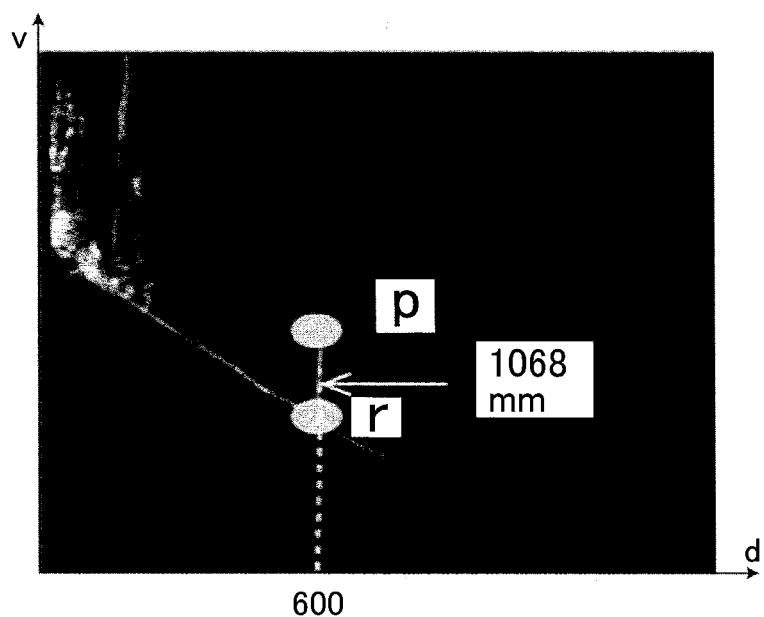
FIG. 9 is a schematic drawing illustrating the calculated distance between a point that is located above the road and the road in the disparity map.

Specifically, first, the height from the road of each of the points above the road in the disparity map $p(u', v', d')$ may be calculated. The coordinate of point $p(u', v', d')$ within the V-disparity map is $(d', v')$. The expression of the road line within the V-disparity map is $v=kd+b$; therefore, the coordinate of point r with a disparity d' that is located above the road line (the road) in the V-disparity map is $(d', kd'+b)$. In the V-disparity map, the pixel distance between the point p and the point r (or the road) is $v'-(kd'+b)$, that is, in the V-disparity map, the distance between the point p and the road is $v'-(kd'+b)$ pixels. The height of the point p to the road within the physical space may be calculated by multiplying such pixel distance by an actual distance within the physical space corresponding to each pixel. The actual distance within the physical space corresponding to each pixel m may be calculated by various methods in the art. For example, the actual distance m may be calculated by the method proposed in "Learning OpenCV", O'Reilly Media, written by Gary Bradski and Adrian Kaebler, the description of this method is omitted here. In the example illustrated in FIG. 8, with respect to the point (400,800,600) within the disparity map, the pixel distance thereof to the road may be calculated as $800-(0.5*600+233)=267$, according to the above method. Supposing the actual distance corresponding to each pixel m is 4 mm, the height of the point to the road is 267 pixels*4 mm/pixel=1068 mm, as illustrated in FIG. 9.

Next, a comparison between the height of the point above the road within the disparity map and the height threshold may be performed. The point is removed from the disparity map if the height of the point to the road is greater than the height threshold, otherwise the point is retained. In the example illustrated in FIG. 9, 1068 mm is less than the height threshold 4 meter, therefore the point is retained.

Figure 10:
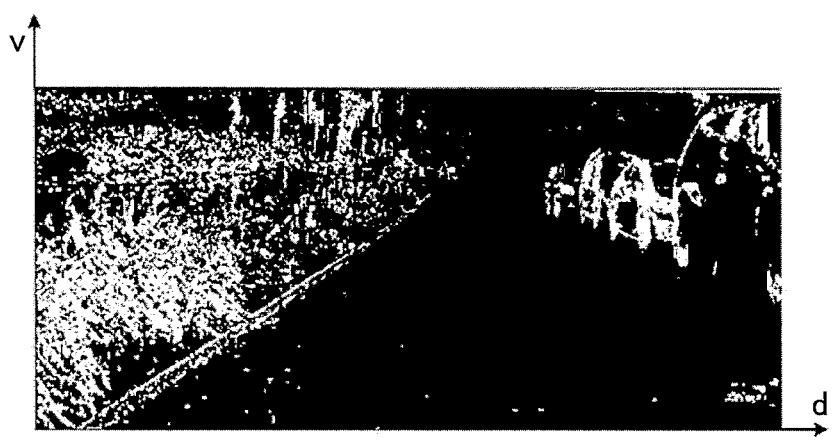
FIG. 10 is a schematic drawing illustrating a sub-disparity map obtained by removing a part with a height above the road greater than a predetermined height threshold from the disparity map illustrated in FIG. 6.

All of the points with a height to the road greater than the height threshold can be determined by performing the above operation for all of the points above the road line within the V-disparity map, and the sub-disparity map can be generated by removing these points from the disparity map. In the example illustrated in FIG. 8, a sub-disparity map illustrated in FIG. 10 can be obtained, when the predetermined height is set as 4 meters.

Figure 11:
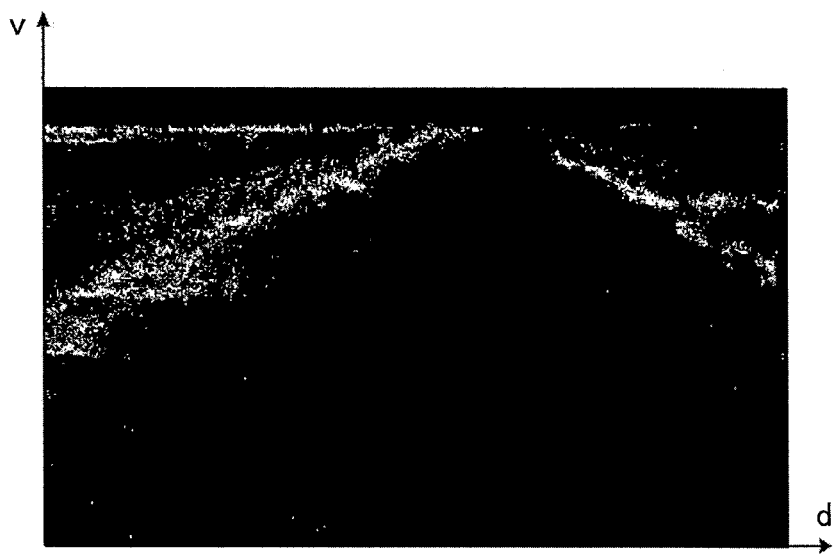
FIG. 11 is a schematic drawing illustrating a U-disparity map obtained by converting the sub-disparity map illustrated in FIG. 10.

Next, in step S403, the sub-disparity map is converted into the U-disparity map. Such conversion may be performed by the above method or other methods in the art. for example, the conversion may be performed by the method proposed in the paper "A Complete UV-Disparity Study for Stereovision Based 3D Driving Environment Analysis" written by Zhencheng Hu, Francisco Lamosa and Keiichi Uchimura, Proceedings of the Fifth International Conference on 3-D Digital Imaging and Modeling 2005 (3DIM'05), pp. 204-211, the detailed description is omitted here. In the above example, the U-disparity map illustrated in FIG. 11 is obtained by converting the sub-disparity map illustrated in FIG. 10.

Returning to FIG. 4, in step S404, the drivable region is detected from the U-disparity map.

As described above, in the disparity map, the positions corresponding to various edges (such as edges of the road and edges of obstacles on the road) have dense points, and the part where there are no edges or a small edge, such as the drivable region of the road have sparse points; therefore, in the U-disparity map, the points corresponding to such edges (corresponding to a non-drivable region) have a higher brightness, and the points corresponding to the drivable region of the road have a lower brightness, when such a disparity map is converted into the U-disparity map. The drivable region may be detected from the U-disparity map according to this fact. Specifically, a detection window with a predetermined size and a brightness threshold may be set, the detection window is shifted from an initial position that is located in the drivable region and is preliminarily selected from the U-disparity map, and it is considered that the current position of the detection window is located in the edge of the drivable region or out of the drivable region of the road if the number (it may also be called a "density of active points") of active points (points with a brightness greater than the brightness threshold) within the detection window exceeds a predetermined number threshold. The size of the detection window and the brightness threshold may be freely set according to an actual condition of the road or the request of the detection accuracy. Finally, a specific region can be detected from the U-disparity map as the drivable region by shifting the detection window. The specific region includes the initial position, and the number of active points with a brightness within the detection window is less than a predetermined number threshold during the time when the detection window is shifted in the specific region. In fact, the shifting process is a process of gradually extending a small drivable region included in the detection window located in the initial position so as to obtain a final drivable region. The initial position may be freely set as long as it located in the drivable region. Usually, because the vehicle is moving on the road, there is not an obstacle in front of the vehicle and such a position is located in the drivable region; therefore, preferably, the position corresponding to such a position, namely, the middle position of the lowest part of the U-disparity map may be selected as the initial position from the U-disparity map, when the drivable region is detected based on the gray scale image picked up by a camera mounted on the vehicle as described above.

The detection window may be shifted by various methods. Preferably, the detection window may be shifted by an 8 adjacent areas (8-CCA) method to detect the specific region. In the following, an example of the process of shifting the detection window by the 8-CCA method will be described with reference to the U-disparity map illustrated in FIG. 11.

Figure 12:
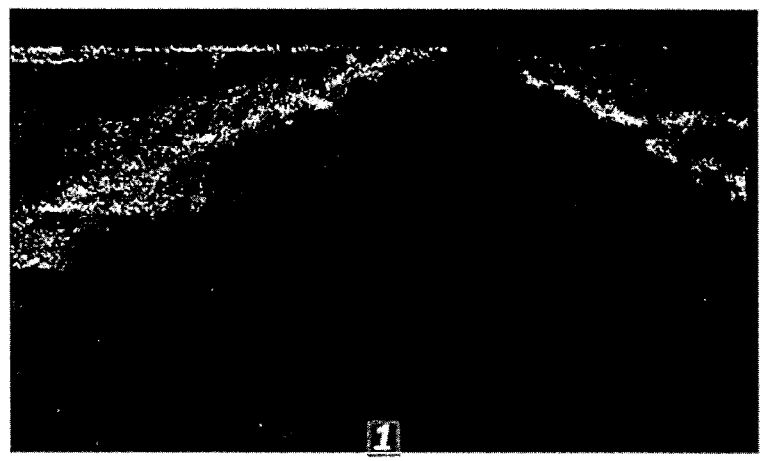
FIG. 12 is a schematic drawing illustrating a process of selecting an initial position from the U-disparity map illustrated in FIG. 11 and setting a detection window.

First, the initial position is selected from the U-disparity map. As illustrated in FIG. 12, in this case, the middle position of the lowest edge within the U-disparity map is selected as the initial position. The detection window is placed at the initial position illustrated as block "1" in FIG. 12.

Figure 13:
FIG. 13 is a schematic drawing illustrating a process of shifting the detection window from the initial position to the left.
Figure 14:
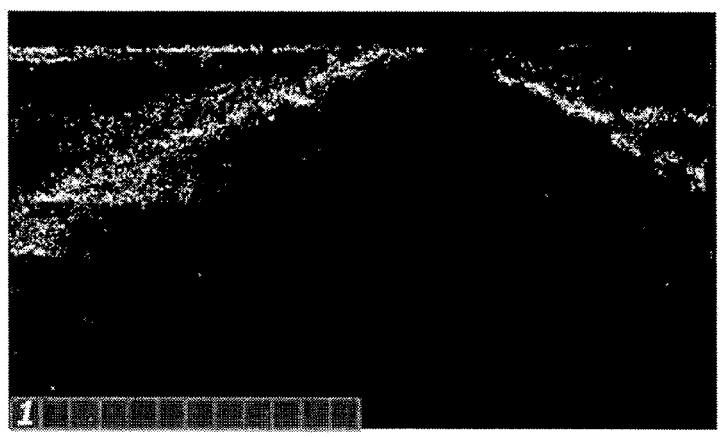
FIG. 14 is a schematic drawing illustrating the determined left stop position of the detection window in said row.

Next, the detection window is horizontally shifted along a direction of rows to the left from the initial position as illustrated in FIG. 13, the shifting of the detection window is stopped and the stop position of the detection window is recorded as a left stop position of the said row if a first determined condition is met. The first predetermined condition is one of the conditions: (1) the number of the active points within the detection window is greater than a predetermined number threshold; (2) the detection window reaches a left edge of the U-disparity map, even though the number of the active points within the detection window is not greater than the predetermined number threshold; and (3) the condition that the horizontal distance between the position of the detection window and the left stop position of the previous row is less than a first distance threshold, even though the detection window does not reach the left edge of the U-disparity map and the number of the active points within the detection window is not greater than the predetermined number threshold. If the condition (1) is met, it is indicated that the detection window has reached or gone out of the edge of the drivable region, therefore the moving of the detection window to the left should be stopped. If the condition (2) is met, it is indicated that the detection window has reached the left edge of the U-disparity map, even though the detection window is still located in the drivable region at this time; therefore, the moving of the detection window to the left should be stopped. The setting of the condition (3) is based on the following fact: in the image picked up by the camera, the closer to the lower end of the image, the wider the illustrated road is, accordingly, the wider the illustrated drivable region is; the closer to the upper end of the image, the narrower the illustrated road is, accordingly, the narrower the illustrated drivable region is; therefore, the more the detection window is moved in an upper direction, the closer to a central line of the image in the horizontal direction the left stop position thereof is. That is, the left stop position in the current row should be located in the right side of the left stop position of the previous row. If the condition (3) is met, it is indicated that the current position of the detection window has reached a position near the left stop position of the previous row, even though the above conditions (1) and (2) are not met; therefore, in order to avoid the detection result contravening the above fact, the moving of the detection window to the left should be stopped. The first distance threshold may be freely set according to the actual condition of the road or the accuracy requirement of the detection result. In the example illustrated in FIG. 13, the detection window is located in the lowest row of the U-disparity map and the number of the active points within the U-disparity map is not greater than the number threshold during the time; therefore, the detection window is shifted to the left edge of the U-disparity map, namely, the left stop position of such row is the left edge of the U-disparity map, as illustrated in FIG. 14.

Figure 15:
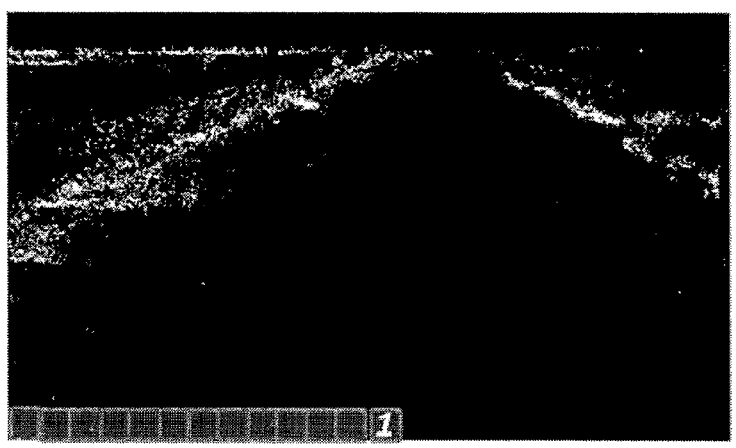
FIG. 15 is a schematic drawing illustrating a process of shifting the detection window from the initial position to the right.
Figure 16:
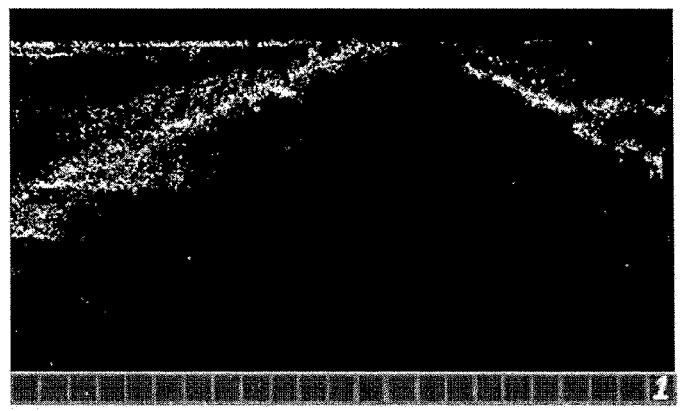
FIG. 16 is a schematic drawing illustrating the determined right stop position of the detection window in said row.
Figure 17:
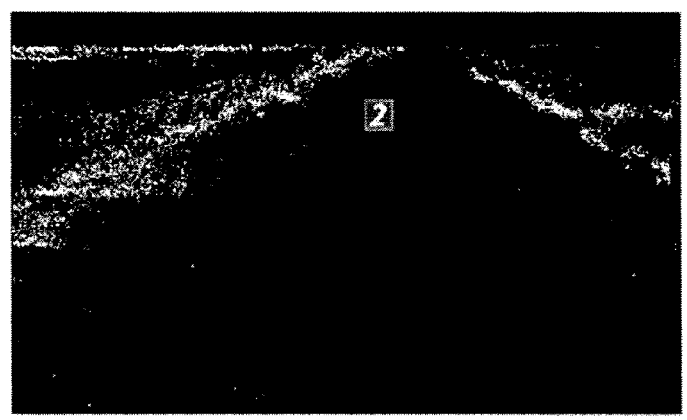
FIG. 17 is a schematic drawing illustrating the initial position after shifting the detection window upward.
Figure 18:
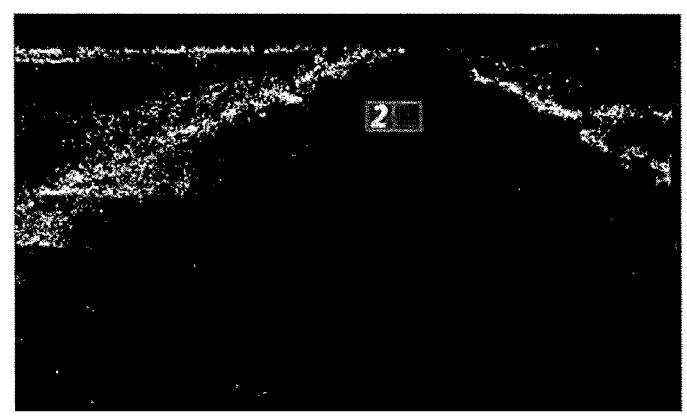
FIG. 18 is a schematic drawing illustrating a process of shifting the detection window from the initial position illustrated in FIG. 17 to the left.
Figure 19:
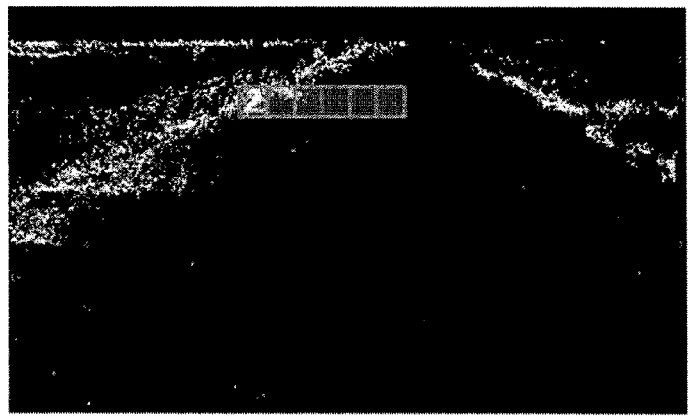
FIG. 19 is a schematic drawing illustrating the determined left stop position of the detection window in said row.
Figure 20:
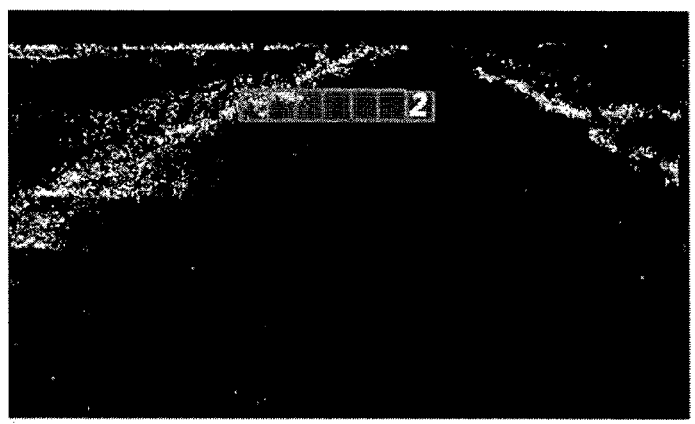
FIG. 20 is a schematic drawing illustrating a process of shifting the detection window from the initial position illustrated in FIG. 17 to the right.
Figure 21:
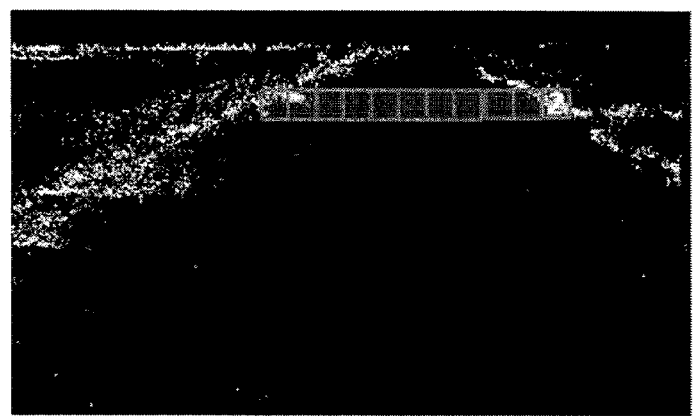
FIG. 21 is a schematic drawing illustrating the determined right stop position of the detection window in said row.

Next, the detection window is horizontally shifted along the direction of rows to the right from the initial position as illustrated in FIG. 15, the shifting of the detection window is stopped and the stop position of the detection window is recorded as a right stop position of the said row if a second determined condition is met. Similarly to the first predetermined condition, the second predetermined condition is one of the conditions: the number of the active points within the detection window is greater than a predetermined number threshold; the condition that the detection window reaches a right edge of the U-disparity map, even though the number of the active points within the detection window is not greater than the predetermined number threshold; and the horizontal distance between the position of the detection window and the right stop position of the previous row is less than a second distance threshold, even though the detection window does not reach the right edge of the U-disparity map and the number of the active points within the detection window is not greater than the predetermined number threshold. The first and second predetermined conditions may be the same or different, but the first and second predetermined conditions are preferably set as the same. In the example illustrated in FIG. 15, similarly, the detection window is shifted to the right edge of the U-disparity map, namely, the right stop position of such row is the right edge of the U-disparity map, as illustrated in FIG. 16.

Next, the detection window is shifted upward by one row, namely a distance equal to the height of the detection window, and repeating the above operations of shifting the detection window to the left and right and the left stop position and the right stop position of such a row is recorded. It should be noted that the initial position of the row for shifting the detection window may be a corresponding position where the initial position of the first row moving upward, or another position reselected from the row within the drivable region.

After finishing the shifting of such a row, an operations of shifting the detection window upward by one row, shifting the detection window to the left and right, and recording the left stop position and the right stop position of the row is repeated until the detection window reaches a top edge of the U-disparity map or the left stop position and the right stop position in the same row are adjacent to each other.

Accompanying the shifting upward of the detection window, the condition for stopping the moving of the detection window may change. For example, FIGS. 17 to 21 illustrate the situation of shifting the detection window to the left and right in the middle row. In this case, the moving of the detection window is stopped because the number of the active points within the detection window is greater than the number threshold, when the detection window is shifted to the left and right.

Figure 22:
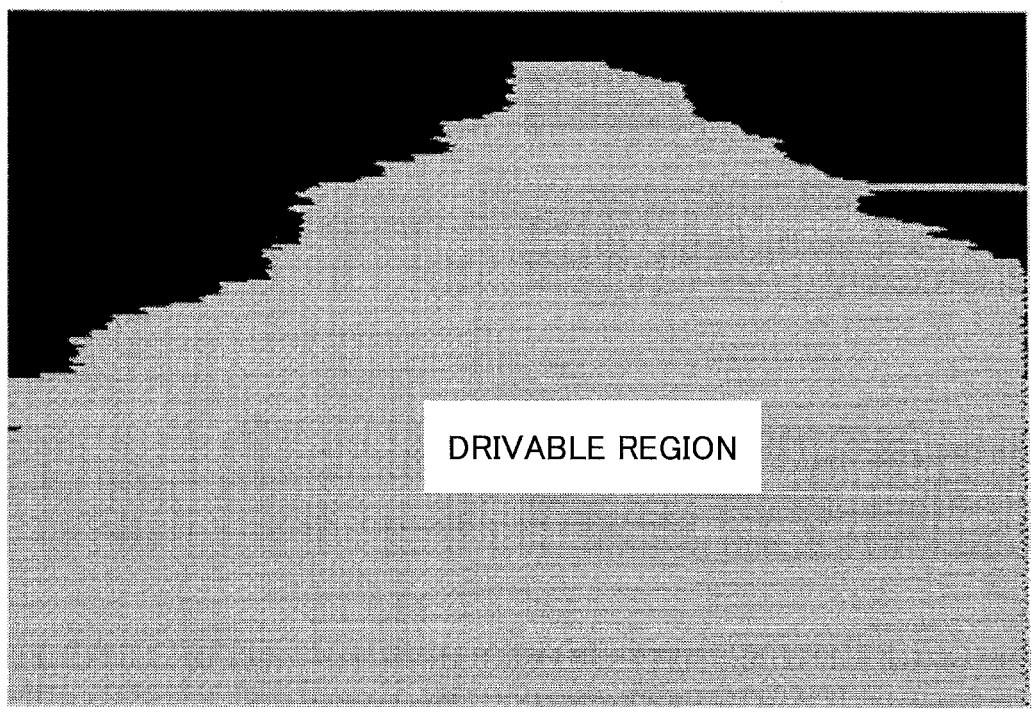
FIG. 22 is a schematic drawing illustrating the drivable region detected from the U-disparity map illustrated in FIG. 11.

Next, a region covered by the shifted detection windows is extracted from the U-disparity map as the drivable region, as illustrated in FIG. 22. In this way, the initial drivable region can be gradually extended and the final drivable region can be obtained by shifting the detection window row by row in the U-disparity map. It should be noted that the method of shifting the detection window row by row as described above is just an example; the present invention is not limited to this method, and other shifting methods, such as shifting the detection window column by column may also be applied, as long as the above specific region can be finally detected.

Returning to FIG. 4, in step S405, the drivable region detected from the U-disparity map is converted into the drivable region within the gray-scale map.

Specifically, coordinates of points within the drivable region detected from the U-disparity map (u', d') may be obtained, after the drivable region is detected from the U-disparity map.

Figure 23:
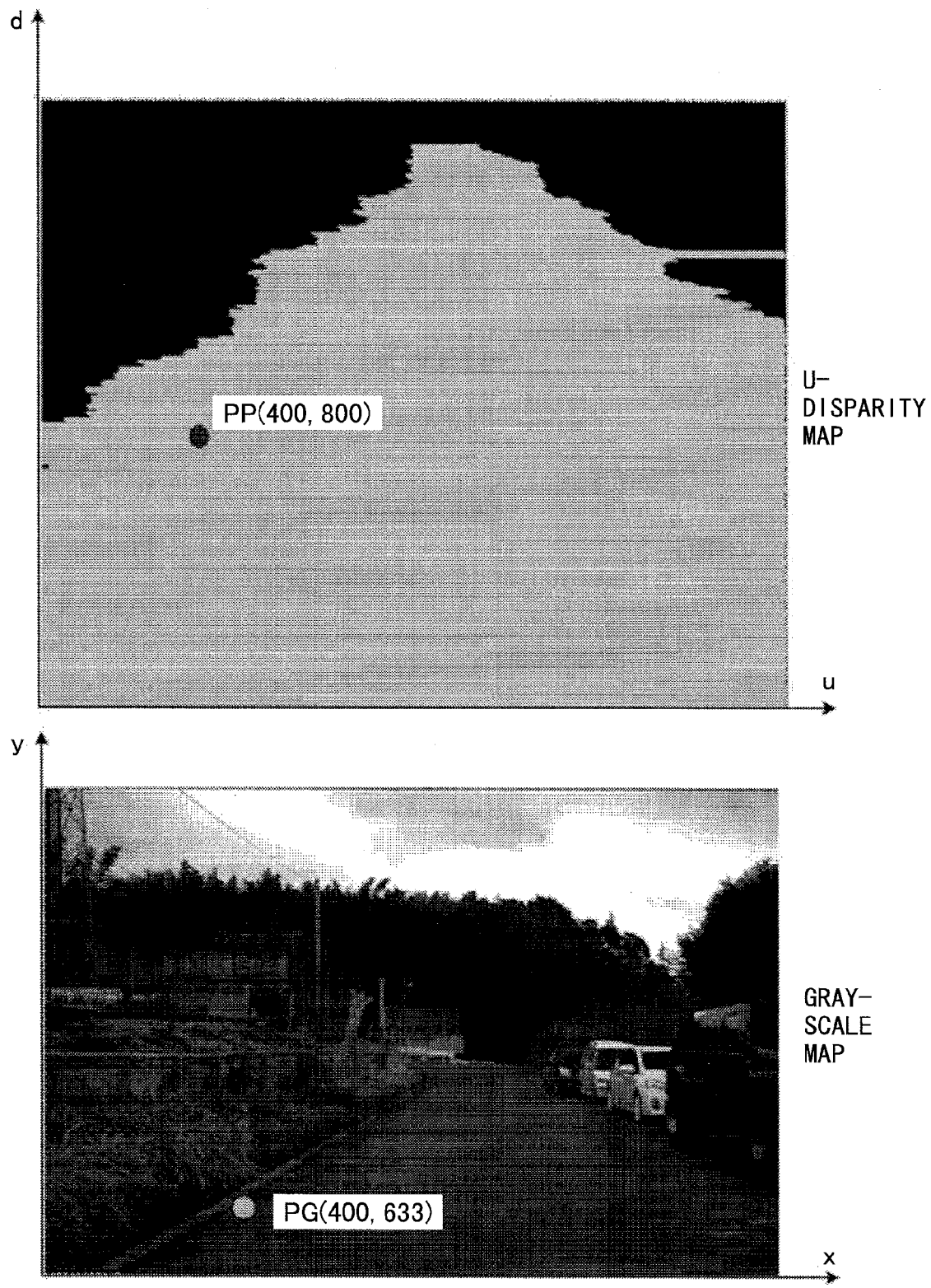
FIG. 23 is a schematic drawing illustrating a coordinate conversion between the U-disparity map and a gray-scale map.

Because the expression of the road line $v=kd+b$ has been determined in the V-disparity map, v' coordinates of points ($v'=kd'+b$) may be calculated by the expression based on the coordinates of the points (u', d'), and the coordinates are the coordinates of the points within the gray scale image ($x'=u'$, $y'=v'$). FIG. 23 illustrates an example of the coordinate conversion. As illustrated in FIG. 23, with respect to a point PP (400, 800) within the U-disparity map, the v' coordinate of such a point can be calculated as 633, based on the expression of the road line $v=0.5d+233$; therefore, the coordinate of such a point within the gray scale image is (400, 633).

Figure 24:
FIG. 24 is a schematic drawing illustrating the drivable region of the road detected from the gray-scale map illustrated in FIG. 5.

Next, the drivable region within the gray-scale map is extracted based on the coordinates of the points within the drivable region of the gray-scale map. FIG. 24 is a schematic drawing illustrating the extracted drivable region of the road in the above example.

From this, the above method according to the embodiment of the present invention has a wide application range because it does not depend on the white lines or a fence on the road. Additionally, in the above detection method, the drivable region is detected by the U-disparity map, at this time, the drivable region is detected by using the density of the active points within the detection window and considering the relationship of the stop positions of the adjacent rows; therefore, the effect of noise in the detection result may be reduced remarkably, so that this method has high anti-noise robustness and reliability.

In the following, the device for detecting the drivable region of the road according to the embodiment of the present invention will be described with reference to FIG. 25. Such a device can perform the method described above.

Figure 25:
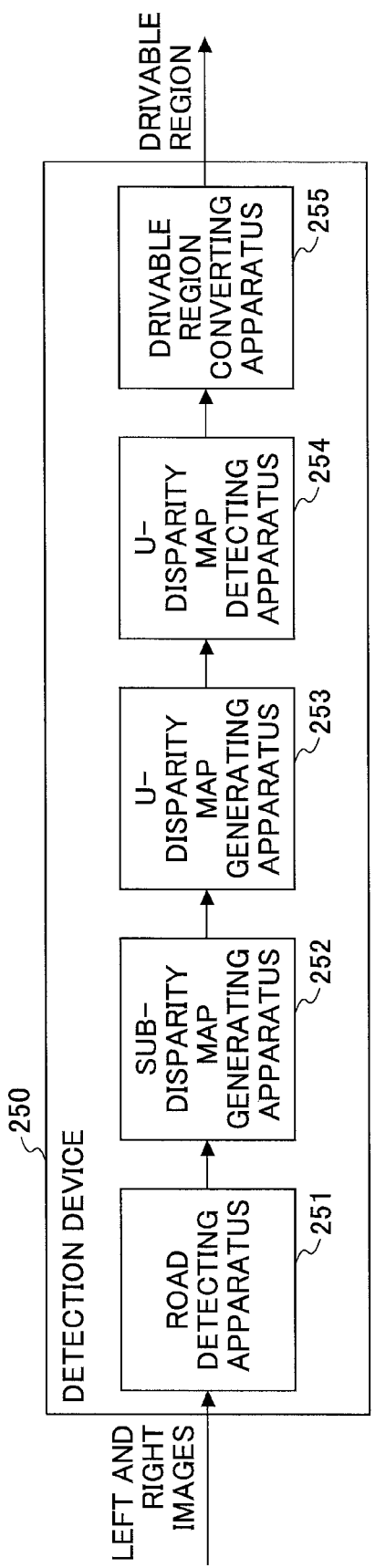
FIG. 25 is a block diagram illustrating a device for detecting the drivable region of the road according to the embodiment of the present invention.

As illustrated in FIG. 25, the detection device 250 comprises: a road detecting apparatus 251, a sub-disparity map generating apparatus 252, a U-disparity map generating apparatus 253, a U-disparity map detecting apparatus 254, and a drivable region converting apparatus 255.

Figure 26:
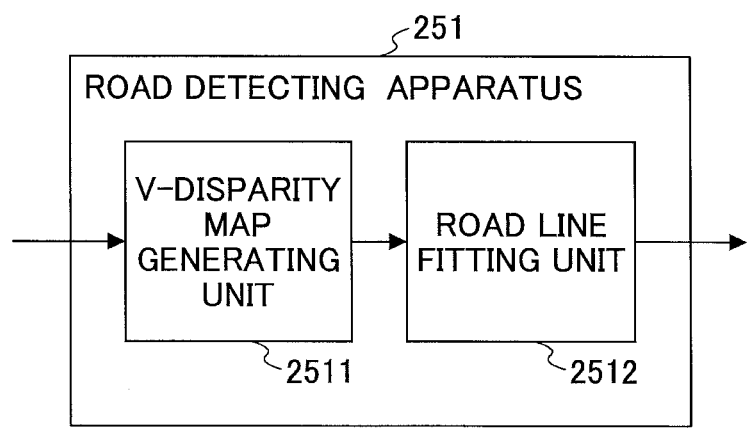
FIG. 26 is a block diagram illustrating the detailed structure of a road detecting apparatus illustrated in FIG. 25.

The road detecting apparatus 251 is configured to derive a disparity map from a gray-scale map including the road and detect the road from the disparity map. FIG. 26 illustrates the detailed structure of the road detecting apparatus 251. As illustrated in FIG. 26, the road detecting apparatus 251 comprises: a V-disparity map generating unit 2511 configured to convert the disparity map into a V-disparity map; and a road line fitting unit 2512 configured to fit a road line representing the road in the V-disparity map.

The sub-disparity map generating apparatus 252 is configured to remove a part with a height above the road greater than a predetermined height threshold from the disparity map so as to generate a sub-disparity map. The sub-disparity map generating apparatus 252 may generate the sub-disparity map according to the above method, and the description thereof is omitted here.

The U-disparity map generating apparatus 253 is configured to convert the sub-disparity map into a U-disparity map.

Figure 27:
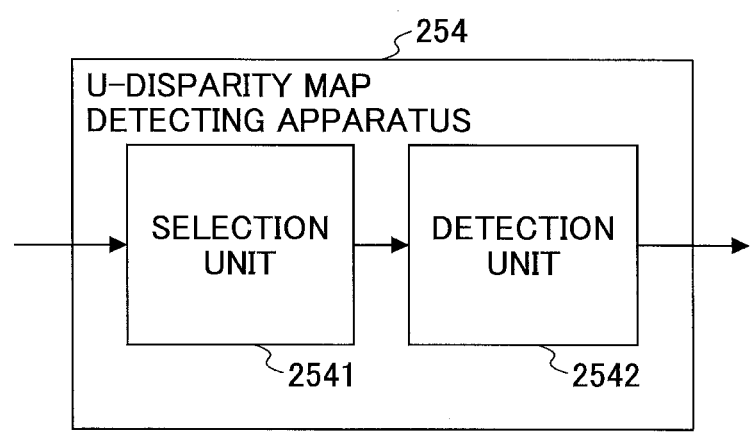
FIG. 27 is a block diagram illustrating the detailed structure of a U-disparity map detecting apparatus illustrated in FIG. 25.

The U-disparity map detecting apparatus 254 is configured to detect the drivable region from the U-disparity map. FIG. 27 illustrates the detailed structure of the U-disparity map detecting apparatus 254. As illustrated in FIG. 27, the U-disparity map detecting apparatus 254 comprises: a selection unit 2541 configured to select an initial position within the drivable region from the U-disparity map; and a detection unit 2542 configured to detect a specific region from the U-disparity map as the drivable region by shifting a detection window with a predetermined size from the initial position in the U-disparity map, wherein the specific region includes the initial position, and the number of active points with a brightness greater than a brightness threshold within the detection window is less than a predetermined number threshold during the time when the detection window is shifted in the specific region. As described above, the initial position is preferably a middle position of the lowest end of the U-disparity map. Additionally, the detection unit 2542 may shift the detection window by the above method (such as 8-CCA method) so as to detect the drivable region from the U-disparity map.

Figure 28:
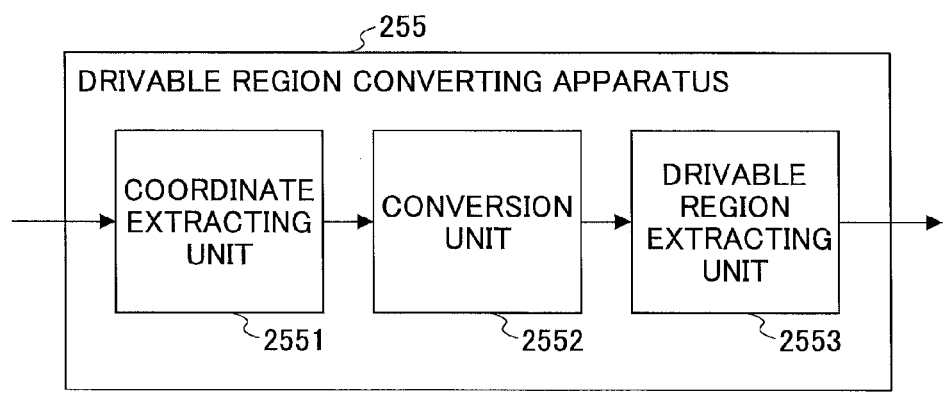
FIG. 28 is a block diagram illustrating the detailed structure of a drivable region converting apparatus illustrated in FIG. 25.

The drivable region converting apparatus 255 is configured to convert the drivable region detected from the U-disparity map into the drivable region within the gray-scale map. FIG. 28 illustrates the detailed structure of the drivable region converting apparatus illustrated 255. As illustrated in FIG. 28, the drivable region converting apparatus 255 comprises: a coordinate extracting unit 2551 configured to obtain coordinates of points within the drivable region detected from the U-disparity map; a conversion unit 2552 configured to calculate coordinates of points within the drivable region of the gray-scale map based on the coordinates of the points, by an expression for fitting the road line in the V-disparity map; and a drivable region extracting unit 2553 configured to extract the drivable region within the gray-scale map based on the coordinates of the points within the drivable region of the gray-scale map.

The road detecting apparatus 251, the sub-disparity map generating apparatus 252, the U-disparity map generating apparatus 253, the U-disparity map detecting apparatus 254, the drivable region converting apparatus 255, and their components may perform the above operation illustrated in FIG. 4, and the description thereof is omitted here.

The basic principle of the present invention is described above with reference to the embodiments. Any one or all of the steps or units of the method or device according to the present invention may be implemented by hardware, firmware, software or their combination in any one of computing devices (including a processor, a storage medium, etc.) or a network of computing devices, and it can be implemented by persons skilled in the art who have read the specification of the present application.

Figure 29:
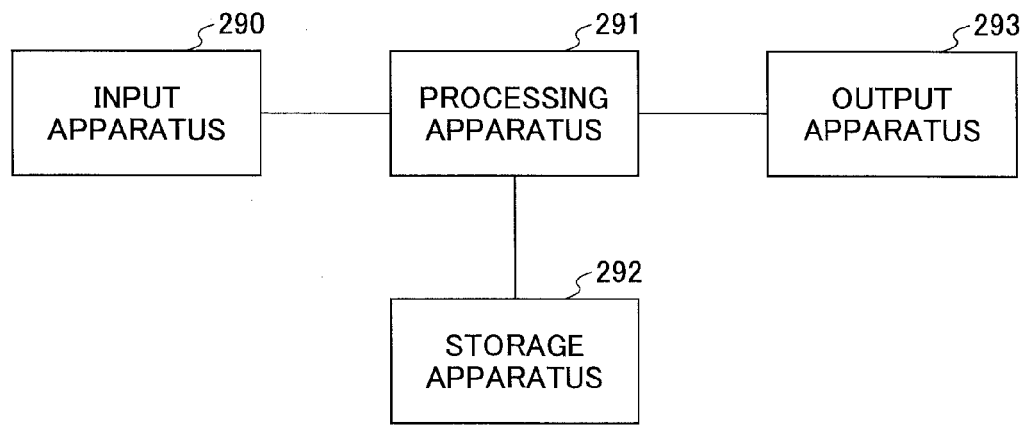
FIG. 29 is schematic drawing illustrating the hardware configuration for implementing the device for detecting the drivable region of the road according to the embodiment of the present invention.

For example, FIG. 29 is schematic drawing illustrating the hardware configuration for implementing the above device. As illustrated in FIG. 29, the device may comprise: an input apparatus 290 for inputting relevant images or information such as left and right images picked up by a binocular camera or stereo video picked up by a stereoscopic camera, for example, including a keyboard, a mouse, and a communication network and an input device connected thereto, etc.; a processing apparatus 291 for receiving the images from the input apparatus 290 and implementing the above method for detecting the drivable region of the road according to the embodiment of the present invention or being implemented as the above apparatus for detecting the continuous road partition with a height according to the embodiment of the present invention, such as a CPU of a computer or other chips having processing ability (as illustrated in FIG. 3), etc.; a storage apparatus 292 for storing the images received from the input apparatus 290 and various data and/or results generated in the operation process performed by the processing apparatus 291, etc., by a volatile method or a nonvolatile method, such as various kinds of volatile or nonvolatile memory including a random-access memory (RAM), a read-only memory (ROM), a hard disk and a semiconductor memory; and an output apparatus 293 for outputting the result obtained by implementing the detected drivable region to the outside, such as a screen, a printer, a communication network and a remote output device connected thereto, etc.

The present invention can also be realized by a program or a set of programs running on any one of computing devices. The computing devices may be well known general-purpose devices. Therefore, the present invention may also be implemented by providing a program product including program codes for implementing the method or apparatus. That is to say, the program product also belongs to the present invention, and a storage medium storing the program product also belongs to the present invention. Obviously, the storage medium may be any one of well known storage media or storage media which are to be developed.

In addition, in the device or method of the present invention, units or steps may be divided and/or recombined. The division and/or recombination should be regarded as an equivalent embodiment of the present invention. Steps of the above method may be performed in time order, however the performing sequence is not limited to the time order. Any steps may be performed in parallel or independently.

Furthermore, the present invention is described under the situation of the vehicle driving assistance technology, however the present invention may also be applied to other fields such as vehicle detection, tracking and driving early warning.

The present invention is not limited to the specifically disclosed embodiments, and various modifications and replacements may be made without departing from the scope of the present invention.

The present application is based on and claims the benefit of priority of Chinese Priority Application No. 201210358202.4 filed on Sep. 24, 2012, the entire contents of which are hereby incorporated by reference.

What is claimed is:

1. A method for detecting a drivable region of a road, comprising the steps of:
generating, using a camera, a gray-scale map including the road;
deriving a disparity map from the gray-scale map including the road and detecting the road from the disparity map;
removing, using a processor, a part with a height above the road greater than a predetermined height threshold from the disparity map so as to generate a sub-disparity map;
converting, using the processor, the sub-disparity map into a U-disparity map;
detecting, using the processor, the drivable region from the U-disparity map; and
converting the drivable region detected from the U-disparity map into the drivable region within the gray-scale map,
the detecting including performing a first detecting operation, the first detecting operation including detecting a specific region from the U-disparity map as the drivable region by shifting a detection window with a predetermined size from an initial position in the U-disparity map,
the performing the first detecting operation including,
(a) horizontally shifting the detection window along a direction of rows to the left from the initial position, and stopping the shifting of the detection window and recording the stop position of the detection window as a left stop position of the said row if a first determined condition is met, horizontally shifting the detection window along a direction of rows to the right from the initial position, and stopping the shifting of the detection window and recording the stop position of the detection window as a right stop position of the said row if a second determined condition is met;
(b) shifting the detection window upward by a distance equal to the height of the detection window, and repeating step (a);
(c) repeating step (b) until the detection window reaches a top edge of the U-disparity map or the left stop position and the right stop position in the same row are adjacent to each other; and
(d) extracting a region covered by the shifted detection windows from the U-disparity map as the drivable region,
wherein the first determined condition is one of the condition that the number of the active points within the detection window is greater than a predetermined number threshold; the condition that the detection window reaches a left edge of the U-disparity map, even though the number of the active points within the detection window is not greater than the predetermined number threshold; and the condition that the horizontal distance between the position of the detection window and the left stop position of the previous row is less than a first distance threshold, even though the detection window does not reach the left edge of the U-disparity map and the number of the active points within the detection window is not greater than the predetermined number threshold,
wherein the second determined condition is one of the condition that the number of the active points within the detection window is greater than a predetermined number threshold; the condition that the detection window reaches a right edge of the U-disparity map, even though the number of the active points within the detection window is not greater than the predetermined number threshold; and the condition that the horizontal distance between the position of the detection window and the right stop position of the previous row is less than a second distance threshold, even though the detection window does not reach the right edge of the U-disparity map and the number of the active points within the detection window is not greater than the predetermined number threshold.

2. The method for detecting a drivable region of a road according to claim 1, wherein the step of detecting the road from the disparity map comprises the steps of:
converting the disparity map into a V-disparity map; and
fitting a road line representing the road in the V-disparity map.

3. The method for detecting a drivable region of a road according to claim 2, wherein the sub-disparity map is generated by removing a part that is located above the road line and has a distance from the road line greater than the predetermined height threshold from the disparity map.

4. The method for detecting a drivable region of a road according to claim 1,
wherein the step of detecting the drivable region from the U-disparity map comprises the step of:
selecting an initial position within the drivable region from the U-disparity map, and
wherein the specific region includes the initial position, and the number of active points with a brightness greater than a brightness threshold within the detection window is less than a predetermined number threshold during the time when the detection window is shifted in the specific region.

5. The method for detecting a drivable region of a road according to claim 2, wherein the step of converting the drivable region detected from the U-disparity map into the drivable region within the gray-scale map comprises the steps of:
obtaining coordinates of points within the drivable region detected from the U-disparity map;
calculating coordinates of points within the drivable region of the gray-scale map based on the coordinates of the points, by an expression for fitting the road line in the V-disparity map; and
extracting the drivable region within the gray-scale map based on the coordinates of the points within the drivable region of the gray-scale map.

6. A device for detecting a drivable region of a road, comprising:
a road detecting apparatus configured to derive a disparity map from a gray-scale map including the road and detect the road from the disparity map;
a sub-disparity map generating apparatus configured to remove a part with a height above the road greater than a predetermined height threshold from the disparity map so as to generate a sub-disparity map;
a U-disparity map generating apparatus configured to convert the sub-disparity map into a U-disparity map;
a U-disparity map detecting apparatus configured to detect the drivable region from the U-disparity map; and
a drivable region converting apparatus configured to convert the drivable region detected from the U-disparity map into the drivable region within the gray-scale map,
the road detecting apparatus being further configured to perform the detecting by performing a first detecting operation, the first detecting operation including detecting a specific region from the U-disparity map as the drivable region by shifting a detection window with a predetermined size from an initial position in the U-disparity map,
the road detecting apparatus being further configured to perform the first detecting operation by
(a) horizontally shifting the detection window along a direction of rows to the left from the initial position, and stopping the shifting of the detection window and recording the stop position of the detection window as a left stop position of the said row if a first determined condition is met, horizontally shifting the detection window along a direction of rows to the right from the initial position, and stopping the shifting of the detection window and recording the stop position of the detection window as a right stop position of the said row if a second determined condition is met,
(b) shifting the detection window upward by a distance equal to the height of the detection window, and repeating step (a),
(c) repeating step (b) until the detection window reaches a top edge of the U-disparity map or the left stop position and the right stop position in the same row are adjacent to each other, and
(d) extracting a region covered by the shifted detection windows from the U-disparity map as the drivable region,
wherein the first determined condition is one of the condition that the number of the active points within the detection window is greater than a predetermined number threshold; the condition that the detection window reaches a left edge of the U-disparity map, even though the number of the active points within the detection window is not greater than the predetermined number threshold; and the condition that the horizontal distance between the position of the detection window and the left stop position of the previous row is less than a first distance threshold, even though the detection window does not reach the left edge of the U-disparity map and the number of the active points within the detection window is not greater than the predetermined number threshold,
wherein the second determined condition is one of the condition that the number of the active points within the detection window is greater than a predetermined number threshold; the condition that the detection window reaches a right edge of the U-disparity map, even though the number of the active points within the detection window is not greater than the predetermined number threshold; and the condition that the horizontal distance between the position of the detection window and the left stop position of the previous row is less than a second distance threshold, even though the detection window does not reach the right edge of the U-disparity map and the number of the active points within the detection window is not greater than the predetermined number threshold.

7. The device for detecting a drivable region of a road according to claim 6, wherein the road detecting apparatus comprises:
a V-disparity map generating unit configured to convert the disparity map into a V-disparity map; and
a road line fitting unit configured to fit a road line representing the road in the V-disparity map.

8. The device for detecting a drivable region of a road according to claim 6, wherein the U-disparity map detecting apparatus comprises:
a selection unit configured to select an initial position within the drivable region from the U-disparity map; and
a detection unit configured to detect a specific region from the U-disparity map as the drivable region by shifting a detection window with a predetermined size from the initial position in the U-disparity map, wherein the specific region includes the initial position, and the number of active points with a brightness greater than a brightness threshold within the detection window is less than a predetermined number threshold during the time when the detection window is shifted in the specific region.

9. The device for detecting a drivable region of a road according to claim 7, wherein the drivable region converting apparatus comprises:
a coordinate extracting unit configured to obtain coordinates of points within the drivable region detected from the U-disparity map;
a conversion unit configured to calculate coordinates of points within the drivable region of the gray-scale map based on the coordinates of the points, by an expression for fitting the road line in the V-disparity map; and a drivable region extracting unit configured to extract the drivable region within the gray-scale map based on the coordinates of the points within the drivable region of the gray-scale map.

* * * * *